United States Patent
Yates et al.

(10) Patent No.: US 11,487,987 B2
(45) Date of Patent: Nov. 1, 2022

(54) EXTERNALLY INFORMED COUNTERFACTUAL PREDICTION

(71) Applicant: Meta Platforms, inc., Menlo Park, CA (US)

(72) Inventors: Andrew Donald Yates, San Francisco, CA (US); Kurt Dodge Runke, Los Altos, CA (US); Gunjit Singh, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 879 days.

(21) Appl. No.: 15/403,093

(22) Filed: Jan. 10, 2017

(65) Prior Publication Data
US 2018/0197090 A1 Jul. 12, 2018

(51) Int. Cl.
*G06N 3/04* (2006.01)
*G06Q 30/02* (2012.01)
*G06Q 50/00* (2012.01)

(52) U.S. Cl.
CPC ............. *G06N 3/04* (2013.01); *G06Q 30/02* (2013.01); *G06Q 30/0241* (2013.01); *G06Q 50/01* (2013.01)

(58) Field of Classification Search
CPC ...... G06N 20/00; G06N 3/0454; G06N 5/022; G06N 7/005; G06N 5/048; G06N 3/08; G06N 3/084; G06N 5/045; G06N 3/04; G06N 3/0445; G06N 3/0472; G06N 3/0481; G06N 3/088; G06N 5/02; G06N 5/04; G06N 7/00; G06N 5/003; G06N 3/006; G06N 3/086; G06N 10/00; G06N 20/20; G06N 20/10; G06N 99/00; G06N 5/046; G06Q 30/0242; G06Q 30/0277
See application file for complete search history.

(56) References Cited

U.S. PATENT DOCUMENTS

2014/0046754 A1* 2/2014 Lee ................... G06Q 30/0242
705/14.41
2015/0161658 A1* 6/2015 Little ................. G06Q 30/0243
705/14.45

OTHER PUBLICATIONS

Chan et al., Evaluating Online Ad Campaigns in a Pipeline: Causal Models at Scale, Jul. 2010 (Year: 2010).*

(Continued)

*Primary Examiner* — Ann J Lo
*Assistant Examiner* — Charles C Kuo
(74) *Attorney, Agent, or Firm* — Fenwick & West LLP (57) ABSTRACT

An online system receives explicit user data and explicit event data, and implicit user data and implicit event data from a third party system. The online system generates an implicit users/implicit events data feature, an explicit users/explicit events data feature, and an explicit users/implicit events data feature. The online system generates a prediction of the counterfactual rate based on the implicit users/implicit events data feature, the explicit users/explicit events data feature, and the explicit users/explicit events data feature, the counterfactual rate indicating the likelihood that target users matching certain characteristics caused an event to occur when the target are not been presented with content by the online system, the content configured to induce users to cause the event to occur. A combined prediction rate is presented to the third party system based on the counterfactual rate.

17 Claims, 3 Drawing Sheets

(56) References Cited

OTHER PUBLICATIONS

Bottou et al., Counterfactual Reasoning and Learning Systems: The Example of Computational Advertising, Nov. 2013, Journal of Machine Learning Research 14 (2013), pp. 3207-3260 (Year: 2013).*

* cited by examiner

EXTERNALLY INFORMED COUNTERFACTUAL PREDICTION

BACKGROUND

This disclosure relates generally to online systems, and in particular to informed counterfactual prediction of actions in an online system.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for third parties to present content to online system users.

In some cases, users of these online systems may be presented with content. The online system measures the effect that the content had upon users' actions in the online system using collected data. The online system may also be able to predict the effects of a content item on a group of users as well. However, this prediction may be inaccurate as it may not account for external influences to a user.

SUMMARY

Embodiments of the disclosure include an online system that predicts a rate at which users of an online system may cause an event to occur that is desired by a third party system when presented with third party content by an online system, taking into consideration situations where a user was not presented with content by the online system and may have been presented with content from a source separate from the online system, but yet still caused the event to occur. The content may be designed to induce the user to cause the event to occur.

To make this prediction, in one embodiment, the online system receives data from the third party system comprising three data sets. The online system receives explicit user data and explicit event data from a third party system The explicit user data identifies a set of users, and the explicit event data identifies a set of events caused by the set of users as logged by the third party system. The users may be identified by hash, email address, or some other unique identifier. The events are identified by the users who caused the events, and may include a viewing, click, or any other type of action by the user, or status change with the third party system. The users are users who have been selected by the third party system to potentially be presented with content item from the third party system.

The online system also receives implicit user data and implicit event data from a third party system. The implicit user data estimates a number of users, and the implicit event data estimates a number of events caused by the estimated number of users. As noted previously, the users are users who have been selected to be potentially presented with content. In contrast to the explicit data, the users in the implicit user data are estimated, based on some shared characteristic of the users (e.g., demographics), some action performed by the user (e.g., at the third party system or at the online system), or using some other identification scheme. The implicit event data does not identify events according to the users that caused the events, but instead estimates for the estimated users the likelihood that those users would cause an event to occur.

The online system generates the three data features sets using the implicit and explicit data. The online system generates an implicit users/implicit events data feature based on the implicit user data and the implicit event data, with the implicit users/implicit events data feature indicating an estimation of events caused by an estimated number of users. The online system generates an explicit users/explicit events data feature based on the explicit user data and the explicit event data, with the explicit users/explicit events data feature identifying individual users and identifying individual events caused by the identified individual users. An explicit users/implicit events data feature set is also generated, and is based on the explicit user data and the implicit user data. The explicit users/implicit events data feature identifies individual users and indicating an estimation of a number of events caused by the identified individual users.

Using these feature sets, the online system generates a prediction of the counterfactual rate based on the implicit users/implicit events data feature, the explicit users/explicit events data feature, and the explicit users/explicit events data feature. The counterfactual rate indicates the likelihood that target users matching certain characteristics caused an event to occur when the target users have not been presented with content by the online system (but may have been presented with content by another system). The online system may in some cases make three separate estimations using the three data sets, and weigh each estimation, e.g., according to the specificity of the data used to make each estimation, in determining a final counterfactual rate. The online system may also use a machine learning module, e.g., a neural network, to generate a prediction. The model is trained with a training set of the above described feature sets along with a (possibly empirically derived) set of output values indicating a ground truth counterfactual rate output for sets of input training data.

The counterfactual rate may be subtracted from a regular rate of event occurrence assuming presentation of content (e.g., a causative rate) to generate a more accurate estimate of the likelihood of users to cause an event to occur when presented with a content item.

Using such a system, the online system is able to more accurately determine the likelihood that a user may cause an event to occur, due to being presented with a content item by the online system. This is because in some cases a user may be influenced by content presented outside the online system. With this more accurate estimation, the online system can present to the third party system more accurate data with which to make a content distribution decision.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
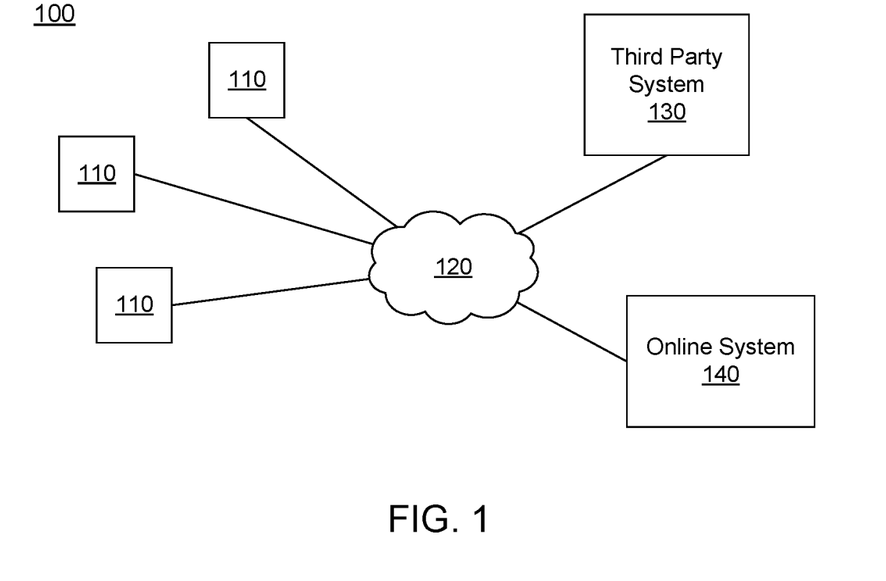
FIG. 1 is a high level block diagram of a system environment for an online system, according to an embodiment.

FIG. 1 is a high level block diagram of a system environment 100 for an online system 140, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a sponsored content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as content, or information about an application provided by the third party website 130. Specifically, in one embodiment, a third party system 130 transmits the sponsored content to the online system 140 for display to users of the client devices 110. The sponsored content may be created by the entity that owns the third party system 130. Such an entity may be a company producing a product, service, message, or something else that the company wishes to promote.

Example Online System

Figure 2:
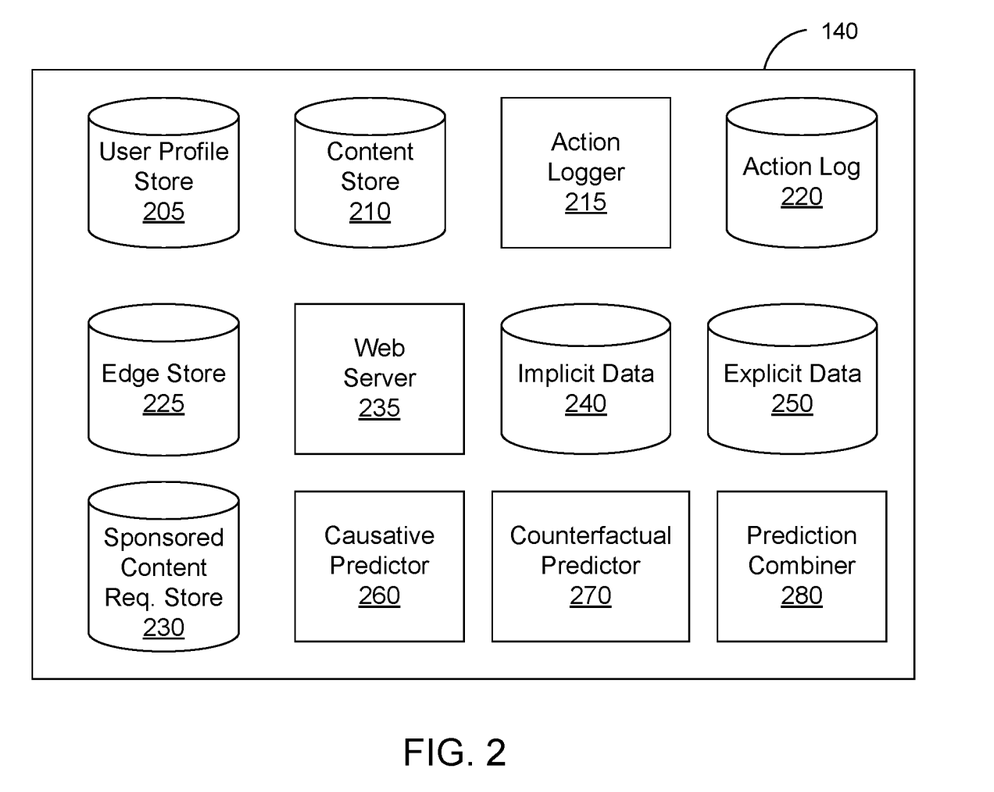
FIG. 2 is an example block diagram of an architecture of the online system, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225, a sponsored content request store 230, a web server 235, an offline conversions receiver 240, a conversions log 250, a set of implicit data 240, a set of explicit data 250, a causative predictor 260, a counterfactual predictor 270, and a prediction combiner 280. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with sponsored content on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, sponsored content that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The sponsored content request store 230 stores one or more sponsored content requests. Sponsored content is content that an entity (i.e., a sponsored content provider) presents to users of an online system and allows the sponsored content provider to gain public attention for products, services, opinions, causes, or messages and to persuade online system users to take an action regarding the entity's products, services, opinions, or causes. A sponsored content request includes sponsored content and a value amount (e.g., a "bid value"). The sponsored content is text, image, audio, video, or any other suitable data presented to a user. In various embodiments, the sponsored content also includes a landing page specifying a network address to which a user is directed when the sponsored content is accessed. The value amount is associated with an ad request by a sponsored content provider (who may be the entity providing the sponsored content) and is used to determine an expected value, such as monetary compensation, provided by a sponsored content provider to the online system 140 if sponsored content in the sponsored content request is presented to a user, if the sponsored content in the sponsored content request receives a user interaction when presented, or if any suitable condition is satisfied when sponsored content in the sponsored content request is presented to a user. In some embodiments, the expected value to the online system 140 of presenting the sponsored content may be determined by multiplying the value amount by a probability of the sponsored content being accessed by a user. In one embodiment, a sponsored content is an advertisement.

Additionally, a sponsored content request may include one or more targeting criteria specified by the sponsored content provider. Targeting criteria included in a sponsored content request specify one or more characteristics of users eligible to be presented with sponsored content in the sponsored content request. For example, targeting criteria are used to identify users having user profile information, edges, or actions satisfying at least one of the targeting criteria. Hence, targeting criteria allow an sponsored content provider to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows sponsored content providers to further refine users eligible to be presented with sponsored content from an sponsored content request. As another example, targeting criteria identifies users having a connection to another user or object or having a particular type of connection to another user or object.

The web server 235 links the online system 140 via the network 120 to the one or more client devices 110, as well as to the one or more third party systems 130. The web server 235 serves web pages, as well as other web-related content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 235 may provide application programming interface (API) functionality to send data directly to native client device operating systems, such as IOS®, ANDROID™, WEBOS® or RIM®.

Implicit Data

The implicit data 240 includes implicit user data and implicit event data. The implicit user data identifies users indirectly by an implicit user indicator, and the implicit event data identifies events indirectly via an implicit event identifier. This information is provided by a third party system 130. Each third party system 130 may provide its own set of implicit user data and implicit event data.

In general, the implicit user data estimates a number of users who have been selected for potential presentation of content from a third party system 130, and the implicit event data estimates a number of events that have occurred in relation to these selected users. As used here, an event refers to any change in a state that is desirable by a third party system 130. This may include having the user view or be presented with the content itself, an action or interaction performed by a user as described above, such as a click, login action, creating a review, sign up action, subscribe action, a comment action, an upload action, a purchase, a view of a video, a share action, etc. This may also include a change in some status for the third party system 130, such as a new user added, a revenue increase, a content added, an increase in traffic, a conversion event, and so on. These events are desirable to the third party system 130, i.e., they may provide a benefit to the third party system 130. For example, a third party system 130 may desire that a user create new accounts so that the third party system 130 may increase a metric for signed up users.

The implicit user indicator is a measure of an estimate of a number of users. The users that are identified indirectly by the implicit user indicator are users who have been selected for potential presentation of a content item(s) from a specified third party system 130. The third party system 130 may have provided a similar implicit user indicator to a separate third party system, which may have presented the content from the third party system 130 to users identified by the implicit user indicator. The implicit user indicator may be a percentage value, one or more descriptors of characteristics of users, a range identifier, or any other method of estimating a number of users. The percentage value indicates a percentage of uses of a general population, users in a particular demographic, or users in another defined group (e.g., users of the online system 140) who have been selected for potential presentation of the content item from the third party system 130. The range identifier may be similar, but instead of specifying a percentage, the range identifier may specify a range of users out of a larger group based on a particular user characteristic, e.g., users in a certain age group range.

The characteristic descriptors describe characteristics of the users who have been selected to be potentially presented with content from the third party system. Users having the same characteristics described in the characteristic descriptors may be selected. These characteristics may include demographic characteristics, user preferences, types of user actions at the third party system 130 or online system 140, geographic regions, time last encountered, and so on. For example, a set of descriptors of characteristics could be users who have 1) commented on a particular page (e.g., of a rock band) at the online system 140 and who are 2) between the ages of 18-24.

The implicit event identifier is similar to the implicit user identifier, but estimates a number of events related to presenting a specified content item(s) to the users identified by the implicit user identifier for a third party system 130 and the specified content item. Note that not all users identified by the implicit user identifier for the specified content item are related to an event, i.e., many users may be presented with the content item but no action or other status change for the third party system 130 will arise as a result. Although the content item presented to the user may directly persuade or otherwise direct the user to cause the event identified by the implicit event identifier to occur, in other cases the content item may not directly indicate such a direction, but the event may nevertheless be tied indirectly to the presentation of the content item.

The implicit event identifier may be a percentage indicating the percentage of the users identified in the implicit user identifier that may cause the event to occur upon the presentation of the content item. For example, for users identified by the implicit user identifier as being users aged 18-24, the implicit event identifier may indicate that 5% of these users may cause the identified event (e.g., an exposure of the content to the user) to occur.

The implicit event identifier may also specify the number of events based on the descriptors of users as described above. For example, the implicit event identifier may be a descriptor indicating user's income level, e.g., over $100,000 and tied to the implicit user identifier of ages 18-24, may indicate that those users with incomes over $100,000 in the 18-24 age range are estimated to cause the event (e.g., a purchase) to occur.

The implicit event identifier may be in another format used to estimate a number of events that are estimated to occur and are related to the users identified by an associated implicit user identifier. In one embodiment, an implicit event identifier may be associated with an explicit user identifier, as described in further detail below.

Explicit Data

The explicit data 250 includes explicit user data and explicit event data. The explicit user data identifies specific users and the explicit event data identifies specific occurrences of events. As with the implicit data 240, the explicit data 250 is provided by a third party system 130. Each third party system 130 may provide its own set of explicit user data and explicit event data.

The explicit user data specifically identifies users using one or more explicit user identifiers. These users are specific users who have been selected for potential presentation of content from the third party system 130. Unlike the implicitly selected users identified by the implicit user identifier, each identified user is specifically identified by the explicit user identifiers. Although the explicit user identifiers identify specific users, they do not necessarily include personally identifiable information for each user. Explicit user identifiers may include email addresses, usernames, unique hashes (that do not include personally identifiable information), a non-hash string value (e.g., an identifier of a user of the online system 140 or the third party system 130), combinations of personally identifiable information (e.g., name, date of birth, zip code, address, phone number), and so on. The explicit user identifiers in the explicit user data may only be for users who have been selected in a recent time period (e.g., 90 days).

If users are presented with content, this content may be presented to users online or offline (i.e., not via the Internet), and may not have been presented to the identified users via the online system 140. Thus, the content could have been presented to the identified users via another system on the Internet (e.g., another third party system).

The explicit event data identifies specific individual events related to the users identified in the explicit user data. The events may be identified using explicit event identifiers, which may identify events by a string value, hash value, related explicit user identifier, and so on. Each explicit event identifier may also identify the type of event that occurred and additional metadata, such as a timestamp of the event (e.g., a viewing of the content at 5 pm last Tuesday). Multiple events may be associated with each identified user, and each event is identified and may be linked together using the same explicit event identifier.

As an example of how the data above may be gathered, a user may have been presented with a content item via a separate third party system, and subsequently performed a click action. The third party system 130 is notified of the presentation of the content item (e.g., via a transmitted message) and records the click action as well (e.g., the click may result in the user's client device being redirected to a system owned by the third party system 130). The third party system 130 identifies the user using a hash value (the explicit user identifier), and identifies the event using the same hash value (the explicit event identifier) and also includes an identifier of the two event types (presentation and click). Both the explicit user identifier and the explicit event identifier are sent by the third party system 130 and received by the online system 140 and stored as the explicit data 250.

Both the implicit data 240 and the explicit data 250 may include additional metadata received from the third party system 130 regarding the implicit data 240 and explicit data 250. For example, identified users and events in the explicit data 250 may be associated with metadata including a timestamp, description of the content item that was presented (if any), demographic information about the user, and so on. Estimated users and events in the implicit data 250 may include geographical information, demographic information, description of the content item that is to be presented, and other associated metadata.

Causative Predictor

The causative predictor 260 determines the probability of an event being caused by a user, assuming that the user has been presented with a content item from a third party system 130. In other words, the causative predictor 260 estimates P(event), where event is the causation of the event. This may be called the causative rate. Using information from the action log 220, third party systems 130, and other sources of data that record user actions at the online system and also which record events caused by the user, the causative predictor 260 predicts the probability value corresponding to the likelihood that a user causes an event to occur, assuming by default that content has already been presented to user by the online system 140. As noted, the event causes some benefit to the third party system 130, and may be specified by the third party system 130 as some specific type of event, or may be a default event type (e.g., a viewing of the content).

The causative predictor 260 may estimate P(event) under specific prediction criteria, such as for a specific group of users (e.g., particular subset of users of the online system), a specific content item, a particular timeframe, a particular event, and so on. For example, the causative predictor 260 may predict P(event) for male users of the online system 140, for a specific content item from the third party system 130 (e.g., a sponsored content item), within the last 90 days, and for a click type event. The specific group of users selected may match the targeting criteria set by the third party system 130 for the specified content item. When making the prediction of the causative rate, the causative predictor 260 may receive the event occurrence data from the third party system 130 (e.g., via a pixel fire or other received message).

The causative predictor 260 may count the users and events fitting the above prediction criteria, and determine the P(event) probability value by counting the number events versus the number of users selected for potential presentation of the content. The ratio of these two values (events/selected users) may be the P(event) value. Thus, following the above example of prediction criteria, if 10 male users caused a click event for a specific content item out of 1000 male users that have been selected for potential presentation of the content item, the then the probability of the event occurring, P(event), is 1% (i.e., $10/1000$).

Additional details regarding the prediction of P(event) is described in U.S. application Ser. No. 13/909,312, filed Jun. 4, 2013.

One purpose of the causative predictor 260 is to predict within some accuracy level the probability of the event occurring as a result of a user being presented with a content item (e.g., a sponsored content item) of the third party system 130 at the online system 140. However, the causative rate determined by the causative predictor 260 may overestimate this rate because it does not account for those cases where a user caused an event to occur but was not presented with content at the online system 140. This user may have been presented with the content at a different third party system (e.g., a competitor to the online system), through some offline source (e.g., in print media), or possibly no content was presented to the user at all. Thus, the online system 140 includes, as described below, a counterfactual predictor 270 which determines a counterfactual rate indicating P(event|¬content), the probability of an event occurring when the user has not been presented with content at the online system 140.

Counterfactual Predictor

The counterfactual predictor 270 determines a probability value that indicates a likelihood that a user caused an event to occur when the user was not presented with content at the online system 140, in contrast to the causative rate. In other words, the counterfactual predictor 270 determines P(event|¬content). In contrast to the causative predictor 260, the counterfactual predictor 270 specifically identifies the likelihood of an event caused by a user when the user has not been presented with a content item from the third party system 130 at the online system 130. In other words, in such a case, the online system 140 has not presented the user with a content item (e.g., a sponsored content item), but the user still caused a desired event to occur for the third party system (e.g., a purchase event). This may be referred to as the counterfactual rate. One purpose of computing the counterfactual rate is so that the counterfactual rate may be subtracted from the causative rate generated by the causative predictor 260, resulting in a more accurate prediction of the contribution of the online system 140 via the content item presented to the user to cause the event to occur.

To determine the counterfactual rate, the counterfactual predictor 270 uses three feature sets comprising combinations of the implicit data 240 and the explicit data 250. The three feature sets comprise: (1) explicit user data and explicit events data, (2) explicit user data and implicit events data, and (3) implicit user data and implicit events data.

The first feature set (1) includes an input set of the explicit user data and the explicit event data from the explicit data 250. The input set may be a subset of the data in the explicit data 250. The explicit data 250 may only be received from certain third party systems 130 that have a close relationship (legally speaking or otherwise) with the online system 140, and where data sharing agreements between the two systems is open. As noted above, the explicit user data identifies specific users and the explicit event data identifies specific events.

Using this information, the counterfactual predictor 270 can determine the rate of events occurring for users who have not been presented with content at the online system 140. For example, an explicit user identifier in the explicit user data may identify a user A, and a corresponding explicit event identifier in the explicit event data may identify an associated event A. The counterfactual predictor 270 can determine that while user A caused event A to occur, user A was not presented with a content item by the online system 140. Thus, this is one instance of an occurrence of an event with no content presented to the respective user. The counterfactual predictor 270 may determine over multiple instances a rate for this first feature set.

The second feature set (2) includes an input set of the explicit user data and the implicit events data. The input set of explicit user data is accessed by the counterfactual predictor 270 from the explicit data 250, while the input set of implicit events data is accessed from the implicit data 240. The input set may be a subset of the respective data in the explicit data 250 and the implicit data 240. The implicit events data may be associated with implicit user data identifying groups of users by various characteristic descriptors. These characteristic descriptors may be the same as the characteristics of the users identified in the explicit user data.

Using this information, the counterfactual predictor 270 can estimate a rate of events occurring for users who have not been presented with content at the online system 140. The counterfactual predictor 270 may use the implicit events data to determine a rate of event occurrence based on the estimated number of events that occurred versus the number of estimated users that were potentially presented with content from the third party system. The counterfactual predictor 270 may filter from the users identified in the input set of explicit user data those users that have been presented with a content item at the online system. The counterfactual predictor 270 uses the rate of event occurrence to predict for each of the remaining users the rate of event occurrence for that identified user. For example, the counterfactual predictor 270 may divide the rate of event occurrence over the users identified in the input set of explicit user data to determine a rate for the second feature set.

The third feature set (3) includes an input set of implicit user data and implicit event data. This input set is accessed from the implicit data 240, and may be a subset of the data in the implicit data 240. The subset may be a random sampling of the implicit data 240, may be a subset of the implicit data 240 with certain user characteristics, and so on. As noted, the implicit user data estimates a number of users who have been selected for potential presentation of content from the third party system, and the implicit event data are an estimation of the events that occurred as caused by the estimated number of users.

Using this third feature set, the counterfactual predictor 270 can estimate the likelihood of an occurrence of an event caused by users for users who have not been presented with content by the online system 140. For example, the counterfactual predictor 270 divide the estimated number of events by the estimated number of users from the input set data to determine a ratio of events to users. In one embodiment, the counterfactual predictor 270 may subtract from the estimated number of users an estimate of a number of users who have already been presented with content, according to internal data of the online system 140.

In one embodiment, the counterfactual predictor 270 combines the three estimations from the three feature sets together by weighing the estimation value of each estimation by a weight factor in order to generate a single counterfactual rate. The weight factor may be based on the accuracy of each estimation, the amount of data, and/or specificity of the data (i.e., granularity of the data) used to compute each estimation. The weight may be higher for data that identifies individual users and events, such as the explicit data, and the weight may also be increased based on the amount of data used to determine the estimation. For example, if the number of users and number of events in the implicit data is estimated using a large sample set by the third party system 130, the weight factor for the feature set (3) may be higher when compared to if the sample set is small.

In one embodiment, the counterfactual predictor 270 combines the data from the three feature sets into a single counterfactual rate using a model. This model may be a machine learning model, such as a neural network, or a logistic regression model. The model is trained using a training set of data that includes data similar to the three feature sets described above, thus the training data includes implicit user/implicit event, explicit user/implicit event, and explicit user/explicit event data. The model is also trained using a training output (i.e., ground truth) indicating the known counterfactual rate for the input training set. The training output may be determined using empirical data gathering over the input data set by identifying the users indicated in the training input data and determining over a period of time whether these users had been presented with content at the online system 140 or elsewhere or at all, and whether the users had caused an event to occur for the third party system 130. Different training sets may be generated for each third party system or each content item and used to train the model.

In one embodiment, the counterfactual predictor 270 also predicts the effect of a content item on a user in causing an event to occur when the content item was presented from outside the online system 140, but also where the user has also been presented with content by the online system 140. Both these content items are both from the same third party system 130. The counterfactual predictor 270 may use the data sets described above to determine the impact (i.e., difference in event occurrence), if any, of content presented to users outside the online system 140 on users who are also presented with content by the online system 140. The counterfactual predictor 270 may also consider this difference as a counterfactual rate.

Prediction Combiner

The prediction combiner 280 combines the causative rate and the counterfactual rate into a single combined rate representing a more accurate computation of the probability that a user causes an action in response to being presented with content from the third party system 130 and by the online system 140. In one embodiment, the single combined rate is represented as P(event)−P(event|¬content). Thus, the prediction combiner 280 takes the causative rate and subtracts the counterfactual rate. The causative rate may overestimate the probability, and the counterfactual rate represents the overestimated error. The causative rate does not account for situations where the user causes the event to occur, but was not shown content from the third party system 130 by the online system 140. The combined rate is a more accurate estimation of the probability of a user causing an event to occur when presented with content.

One potential use for the system described above is to be able to correctly attribute the cause of a conversion (i.e., an event) to the online system 140, or not to the online system 140. In some cases, a user may view sponsored content (i.e., content) elsewhere, separately from the online system 140. For example, the user could have viewed the sponsored content on a physical medium (e.g., a billboard), or on another system (e.g., a competitor). For cases where the user saw these sponsored content items outside of the online system and later converted, the online system 140 should not attribute the conversion to the online system 140 but should subtract these conversions, indicated by the counterfactual rate, from the total conversion rate (i.e., the combined rate).

By utilizing external data from the third party systems in the form of the implicit data 240 and the explicit data 250, the online system 140 is able to accurately determine the actual counterfactual rate at which users may cause the event to occur without being presented with content. This cannot necessarily be achieved through data available natively to the online system 140 itself because the online system 140 may only have information regarding users of the online system 140 and their actions rather than all users that may have been presented with content from the third party system 130.

Exemplary Diagram Illustrating the Generation of a Combined Rate

Figure 3:
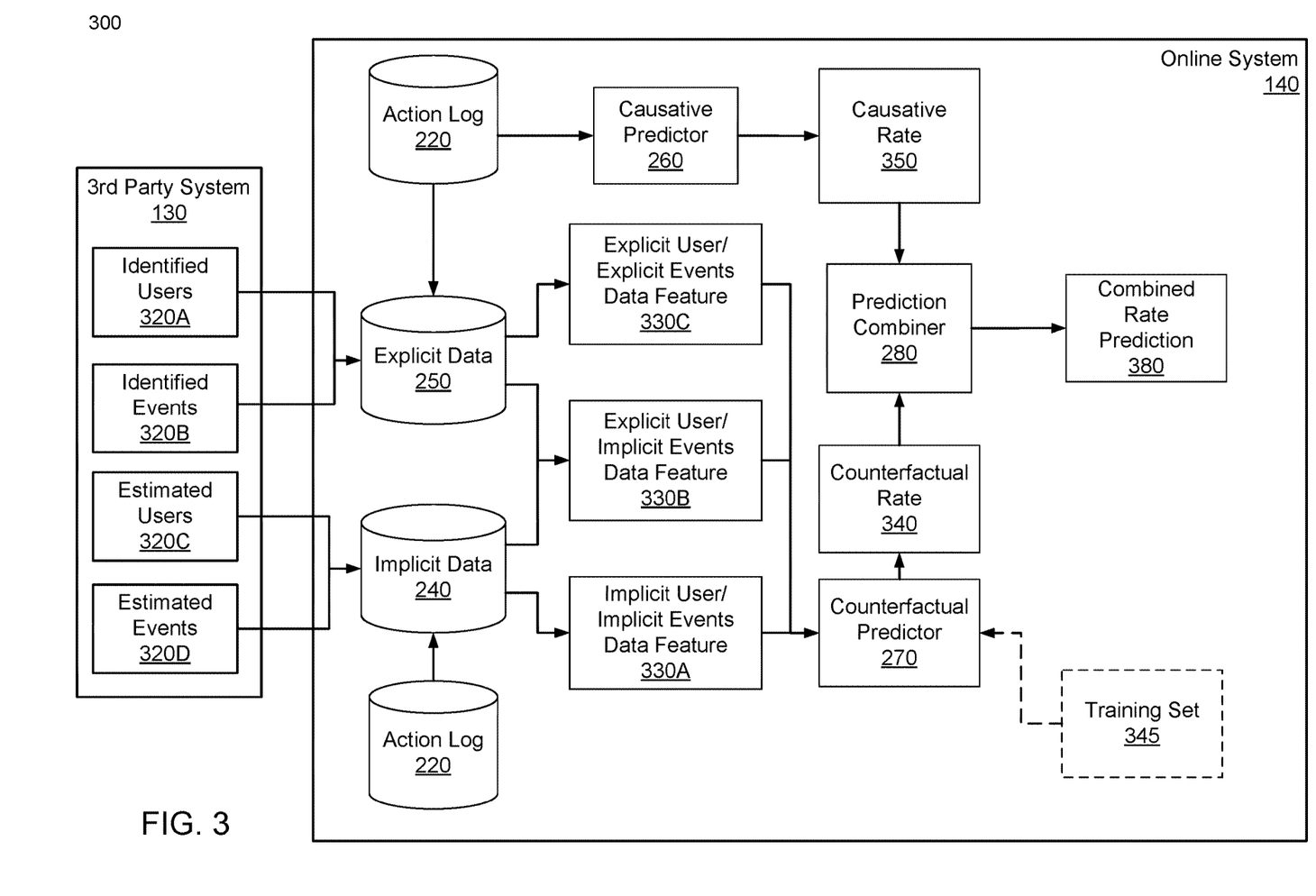
FIG. 3 is a diagram illustrating a process 300 generating a prediction of the combined rate based on the counterfactual rate and the causative rate, according to an embodiment.

FIG. 3 is a diagram illustrating a process 300 generating a prediction of the combined rate based on the counterfactual rate and the causative rate, according to an embodiment. The online system 140 receives data 320A-D from the third party system 130 that includes identified users 320A and identified events 320B, as well as estimated users 320C and estimated events 320D. This information is received by the online system 140, along with any metadata, and forms the basis of the explicit data 250 and the implicit data 240 as described above.

The online system 140 takes the explicit data 250, the implicit data 240, and any local data about users and events, which may be found, for example, in the action log 220, and generates the features 330 for the counterfactual predictor 270. These features include the explicit user/explicit events data feature 330C, the explicit user/implicit events data feature 330B, and the implicit user/implicit events data feature 330A. These features correspond to the three feature sets (1, 2, and 3) described above with regards to FIG. 2.

The feature sets are received by the counterfactual predictor 270, which generates the counterfactual rate 340. The counterfactual rate 340 indicates the likelihood that a user will cause an event to occur when not presented with content from a third party system 130 by the online system 140. The counterfactual predictor 270 may use a training set 345 to train a model to predict the counterfactual rate 340, as described previously.

In tandem, the causative predictor, using data from the action log 220 (and possibly other sources) determines the causative rate 350, which is the likelihood that a user may cause an event to occur, with the assumption that the user has already been presented with the content item by the online system 140.

The prediction combiner 280 combines the causative rate 350 and the counterfactual rate 340 to generate the combined rate prediction 380. In one embodiment, the counterfactual rate is subtracted from the causative rate 350 to generate the combined rate prediction 380. The combined rate prediction is a more accurate prediction of the effect of presenting content to users of the online system 140 and indicates the likelihood that users would cause an event to occur that is desirable to the third party system 130 upon being presented with the content.

The combined rate prediction 380 may in turn be used to determine an accurate compensation amount for the third party system 130 to present content from the third party system 130 to users of the online system 140, which is based more accurately on how likely a user is likely to cause the desired event once presented with the content.

Exemplary Flow

Figure 4:
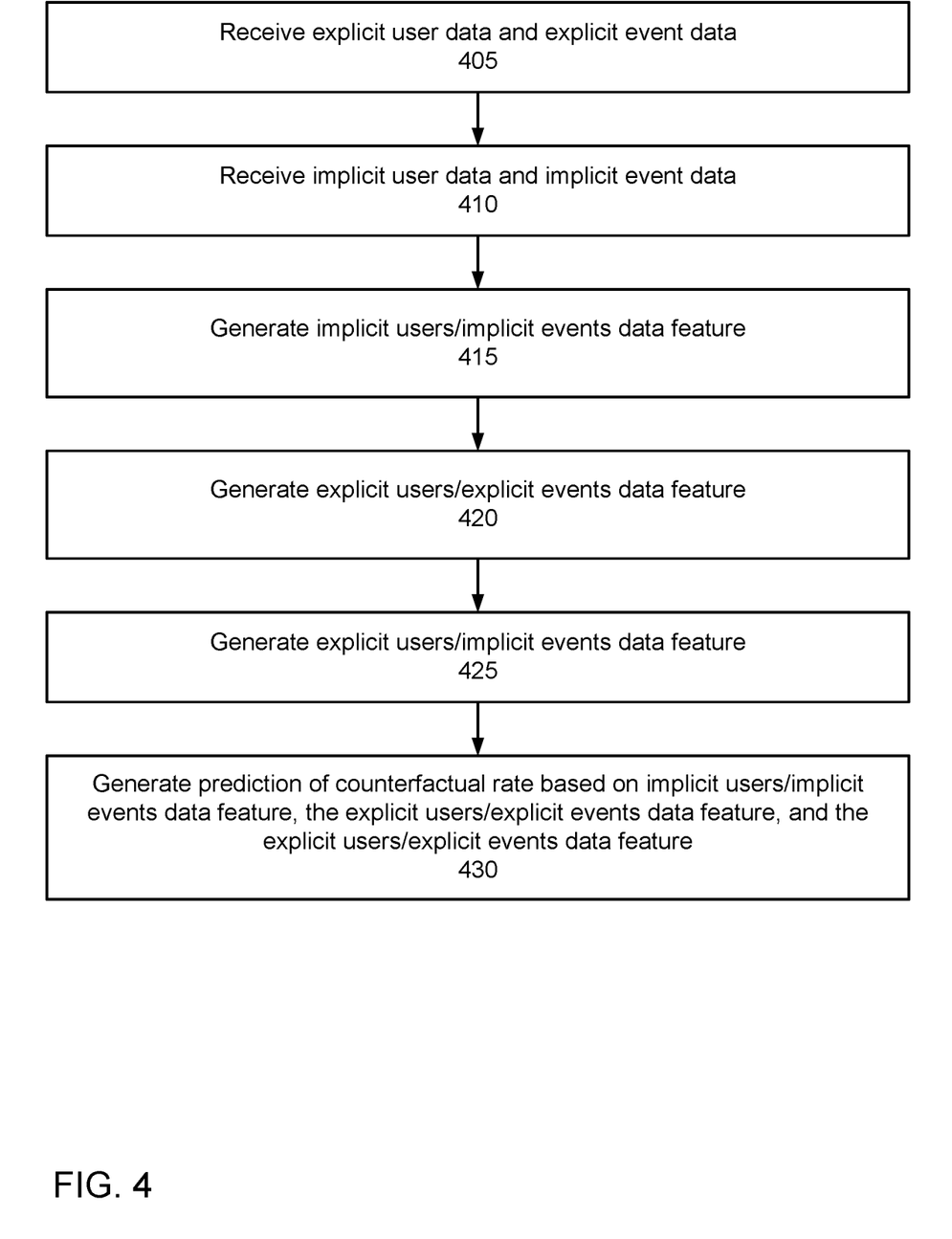
FIG. 4 is a flowchart of one embodiment of a method in an online system for determining a counterfactual rate, according to an embodiment.

FIG. 4 is a flowchart of one embodiment of a method in an online system for determining a counterfactual rate, according to an embodiment. In other embodiments, the method may include different and/or additional steps than those described in conjunction with FIG. 4. Additionally, in some embodiments, the method may perform the steps described in conjunction with FIG. 4 in different orders. In one embodiment, the method is performed by one or more of the modules of the online system 140 described above.

The online system 140 receives 405 explicit user data and explicit event data from a third party system (e.g., third party system 130). The explicit user data identifies a set of users, and the explicit event data identifies a set of events caused by the set of users as logged by the third party system.

The online system 140 receives 410 implicit user data and implicit event data from a third party system. The implicit user data estimates a number of users, and the implicit event data estimates a number of events caused by the estimated number of users.

The online system 140 generates 415 an implicit users/implicit events data feature based on the implicit user data and the implicit event data. The implicit users/implicit events data feature, as described above, indicates an estimation of events caused by an estimated number of users.

The online system 140 generates 420 an explicit users/explicit events data feature based on the explicit user data and the explicit event data. The explicit users/explicit events data feature, as described above, identifies individual users and identifies individual events caused by the identified individual users.

The online system 140 generates 425 an explicit users/implicit events data feature based on the explicit user data and the implicit user data. The explicit users/implicit events data feature identifies individual users and indicates an estimation of a number of events caused by the identified individual users.

The online system 140 generates 430 a prediction of the counterfactual rate based on the implicit users/implicit events data feature, the explicit users/explicit events data feature, and the explicit users/explicit events data feature. The counterfactual rate indicates the likelihood that target users matching certain characteristics cause an event to occur when the target users have not been presented with content from the online system. The content is configured to induce users to cause the event to occur. The prediction uses a model trained using a training data set of the implicit users/implicit events data features, the explicit users/explicit events data features, and the explicit users/explicit events data features, and a set of training outputs indicating whether users identified in the training data set would have caused an event to occur.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, at an online system, explicit user data and explicit event data from a third party system, the explicit user data from the third party system specifically identifying each user of a set of users with a unique identifier, each user eligible to be potentially presented with content from the third party system, and the explicit event data identifying a set of individual events caused by the set of users identified by the explicit user data and logged by the third party system, an event being a change in state caused by a user interaction with one or more different content at the third party system;

receiving, at the online system, implicit user data and implicit event data from a third party system, the implicit user data estimating a total number of users who have been selected by the third party system to potentially be presented with content from the third party system, and the implicit event data estimating a total number of events related to the third party system presenting the content to the estimated total number of users at the third party system;

generating an implicit users/implicit events data feature by calculating a ratio of the estimated total number of events included in the implicit event data and the estimated total number of users included in the implicit user data, the implicit users/implicit events data feature indicating a likelihood of an occurrence of an event at the third party system caused by users from the estimated total number of users in the implicit user data who have not been presented with content by the online system;

generating an explicit users/explicit events data feature based on the explicit user data and the explicit event data, the explicit users/explicit events data feature identifying a rate of occurrence of the individual events at the third party system for users from the set of users in the explicit user data that were not presented with the content by the online system;

generating an explicit users/implicit events data feature based on the explicit user data and the implicit event data, the explicit users/implicit events data feature identifying an estimated rate of occurrence of events at the third party system for users from the set of users in the explicit user data that were not presented with the content by the online system;

generating a prediction of a counterfactual rate based on the implicit users/implicit events data feature, the explicit users/explicit events data feature, and the explicit users/implicit events data feature, the counterfactual rate indicating a likelihood that target users matching certain characteristics caused an event to occur when the target users were not presented with content by the online system, the content configured to induce users to cause the event to occur, wherein the prediction is generated by a machine learning model, and wherein the machine learning model is trained by:
 inputting to the machine learning model an input training set the input training set including an implicit users/implicit events input, an explicit users/explicit events input, and an explicit users/explicit events input,
 inputting into the machine learning model an output training set that indicates a known counterfactual rate for users indicated in the input training set, and
 iteratively updating, using the input training set and output training set, a plurality of weight values in the machine learning model to generate a plurality of final weight values that cause the machine learning model to predict the counterfactual rate based on the implicit users/implicit events data feature, the explicit users/explicit events data feature, and the explicit users/implicit events data feature; and transmitting a combined prediction rate to the third party system based on subtracting the counterfactual rate from a generated causative rate, the causative rate indicating a likelihood that target users matching certain characteristics caused an event to occur when the target users were presented with content by the online system.

2. The method of claim 1, wherein the implicit user data, implicit event data, explicit user data, and explicit event data is generated based on collected data within a period of time.

3. The method of claim 1, wherein the implicit user data includes one or more implicit user identifiers to identify a group of users that are selected for potential presentation of content from the third party system.

4. The method of claim 1, wherein the implicit event data includes an implicit event identifier indicating a percentage of the users estimated in the implicit user data that have caused an event to occur.

5. The method of claim 1, wherein the explicit user data includes one or more explicit user identifiers identifying individual users of the set of users by a unique identifier, the individual users selected for potential presentation of content from the third party system.

6. The method of claim 1, wherein the explicit event data includes one or more explicit event identifiers identifying events associated with the set of users identified by the explicit user data.

7. The method of claim 1, further comprising:
 determining a causative rate indicating a likelihood that target users matching certain characteristics caused an event to occur assuming that the target users have been presented with content by the online system;
 generating a combined rate based on the causative rate and the counterfactual rate, the combined rate generated by subtracting the counterfactual rate from the causative rate; and
 transmitting information based on the combined rate to the third party system.

8. The method of claim 7, wherein the causative rate and the counterfactual rate are computed using data related to a single third party system.

9. A computer program product comprising a non-transitory computer readable storage medium having instructions encoded thereon that, when executed by a processor, cause the processor to:
 receive, at an online system, explicit user data and explicit event data from a third party system, the explicit user data from the third party system specifically identifying each user of a set of users with a unique identifier, each user eligible to be potentially presented with content from the third party system, and the explicit event data identifying a set of individual events caused by the set of users identified by the explicit user data and logged by the third party system, an event being a change in state caused by a user interaction with one or more different content at the third party system;
 receive, at the online system, implicit user data and implicit event data from a third party system, the implicit user data estimating a total number of users who have been selected by the third party system to potentially be presented with content from the third party system, and the implicit event data estimating a total number of events related to the third party system presenting the content to the estimated total number of users at the third party system;
 generate an implicit users/implicit events data feature by calculating a ratio of the estimated total number of events included in the implicit event data and the estimated total number of users included in the implicit user data, the implicit users/implicit events data feature indicating a likelihood of an occurrence of an event at the third party system caused by users from the estimated total number of users in the implicit user data who have not been presented with content by the online system;

generate an explicit users/explicit events data feature based on the explicit user data and the explicit event data, the explicit users/explicit events data feature identifying a rate of occurrence of the individual events at the third party system for users from the set of users in the explicit user data that were not presented with the content by the online system;

generate an explicit users/implicit events data feature based on the explicit user data and the implicit event data, the explicit users/implicit events data feature identifying an estimated rate of occurrence of events at the third party system for users from the set of users in the explicit user data that were not presented with the content by the online system;

generate a prediction of a counterfactual rate based on the implicit users/implicit events data feature, the explicit users/explicit events data feature, and the explicit users/implicit events data feature, the counterfactual rate indicating a likelihood that target users matching certain characteristics caused an event to occur when the target users were not presented with content by the online system, the content configured to induce users to cause the event to occur, wherein the prediction is generated by a machine learning model, and wherein the machine learning model is trained by:

inputting to the machine learning model an input training set the input training set including an implicit users/implicit events input, an explicit users/explicit events input, and an explicit users/explicit events input, inputting into the machine learning model an output training set that indicates a known counterfactual rate for users indicated in the input training set, and iteratively updating, using the input training set and output training set, a plurality of weight values in the machine learning model to generate a plurality of final weight values that cause the machine learning model to predict the counterfactual rate based on the implicit users/implicit events data feature, the explicit users/explicit events data feature, and the explicit users/explicit events data feature; and transmit a combined prediction rate to the third party system based on subtracting the counterfactual rate from a generated causative rate, the causative rate indicating a likelihood that target users matching certain characteristics caused an event to occur when the target users were presented with content by the online system.

10. The computer program product of claim 9, wherein the implicit user data, implicit event data, explicit user data, and explicit event data is generated based on collected data within a period of time.

11. The computer program product of claim 9, wherein the implicit user data includes one or more implicit user identifiers to identify a group of users that are selected for potential presentation of content from the third party system.

12. The computer program product of claim 9, wherein the implicit event data includes an implicit event identifier indicating a percentage of the users estimated in the implicit user data that have caused an event to occur.

13. The computer program product of claim 9, wherein the explicit user data includes one or more explicit user identifiers identifying individual users of the set of users by a unique identifier, the individual users selected for potential presentation of content from the third party system.

14. The computer program product of claim 9, wherein the explicit event data includes one or more explicit event identifiers identifying events associated with the set of users identified by the explicit user data.

15. The computer program product of claim 9, wherein the non-transitory computer readable storage medium has further instructions, that when executed by the processor, causes the processor to:

determine a causative rate indicating a likelihood that target users matching certain characteristics caused an event to occur assuming that the target users have been presented with content by the online system;

generate a combined rate based on the causative rate and the counterfactual rate, the combined rate generated by subtracting the counterfactual rate from the causative rate; and transmit information based on the combined rate to the third party system.

16. The computer program product of claim 15, wherein the causative rate and the counterfactual rate are computed using data related to a single third party system.

17. The method of claim 1, wherein the implicit user/implicit events data feature is calculated by the trained machine learning model.

* * * * *